Feb. 26, 1957 E. M. LINTON 2,782,548
FISHHOOK
Filed Nov. 19, 1954

INVENTOR.

EARL M. LINTON

United States Patent Office 2,782,548
Patented Feb. 26, 1957

2,782,548

FISHHOOK

Earl M. Linton, Tampa, Fla.

Application November 19, 1954, Serial No. 469,975

1 Claim. (Cl. 43—37)

This invention relates to fish hooks.

In conventional fish hooks, many fish escape that bite the bait because the point of the hook extends too far up from the bend of the hook toward the eye so that the fish must practically swallow the entire hook in order to be caught.

It is accordingly a principal object of the present invention to provide an improved fish hook wherein the point of the hook is disposed at the lowest point and wherein upon the slightest pull on the line, the point is thrown outwardly and upwardly to hook the fish deeply.

It is another object of the present invention to provide a fish hook of the above type which is adapted to land even small fish or fish with small mouths, enabling many different sized fish to be caught with the same hook.

It is still another object of the present invention to provide a fish hook of the above type which is designed to hook large fish that an ordinary hook would miss and wherein the point of the hook is thrown outwardly and upwardly to engage it in the fish as a bite is received.

Other objects of the present invention are to provide a fish hook bearing the above objects in mind which is of simple construction, has a minimum number of parts, is inexpensive to manufacture, and efficient in operation.

For other objects and a better understanding of the invention, reference may be had to the following detailed description taken in connection with the accompanying drawing, in which.

Figure 1:
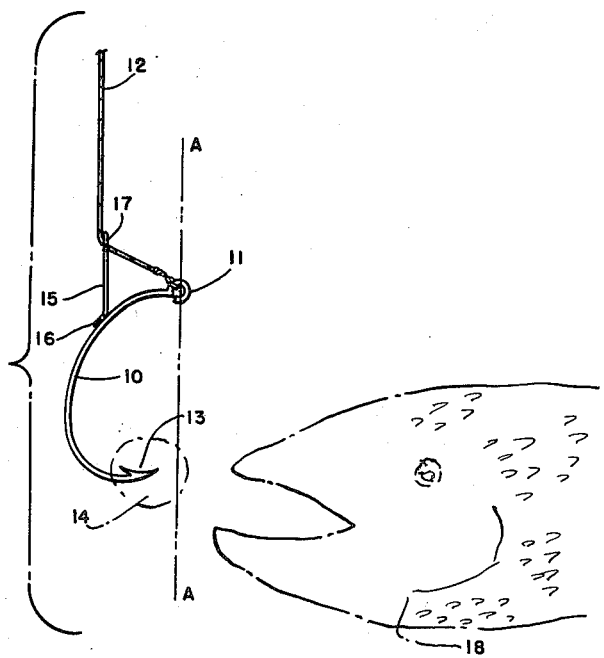
Figure 1 is a side elevational view of a preferred embodiment of the present invention shown just prior to the fish bite of the bait.

Referring now more in detail to the drawing, 10 represents a curved hook formed from metal and integrally formed at its upper end with an eye 11 to which the fish line 12 is connected, substantially as illustrated. The lower end of the hook 10 is formed with the sharp point 13 which receives thereon the usual bait 14.

A normally straight spring-like length of wire, plastic or other suitable material 15 is secured to the hook 10, for example by welding 16 and is formed at its upper end with an eye 17 through which the line 12 is threaded.

Fig. 1 shows the disposition of the hook 10 and spring wire 15 as the bait 14 is suspended freely within the water and just prior to the biting thereof by the fish 18.

It will be noted that the point 13 is hanging at the lowest possible position relative to the eye 11.

Figure 2:
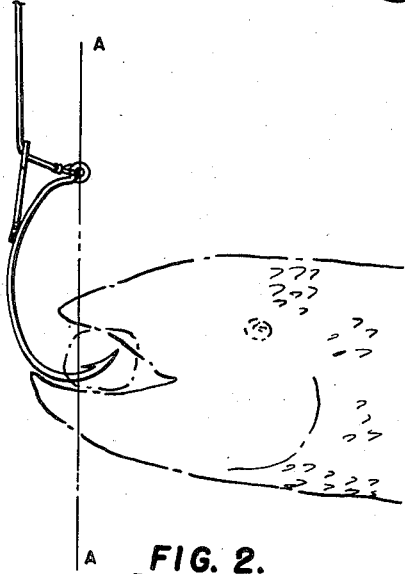
Fig. 2 is a view similar to Fig. 1 but showing the hook as the bait is received in the mouth of the fish.

Referring to Fig. 2, as the bait 14 is received in the mouth of the fish 18, the point 13 is snapped upwardly and outwardly relative to the vertical plane A—A (compare with Fig. 1) to hook the fish.

Figure 3:
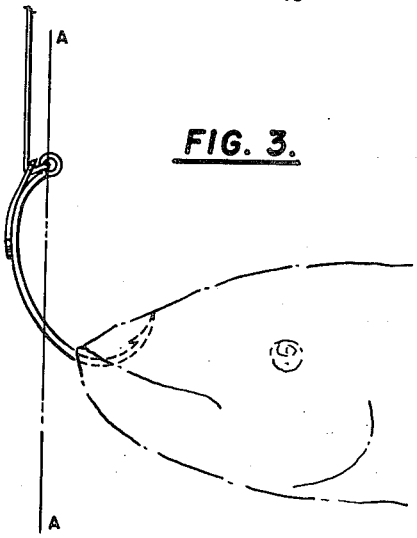
Fig. 3 is a view similar to Fig. 1, but showing the outward and upward projection of the hook as the fish is landed.

Referring now to Fig. 3, it will be seen that the hook 13 has reached its upper and outermost position as the fish is hooked and being brought in. It will be noted that the hook point 13 is now relatively high so that the fish cannot escape. It will be noted that as the fish is hooked (Fig. 3) the spring wire 15 and the eye 17 thereof are brought together with the upper portion of the hook 10 and the eye 11. Due to the spring wire 15, attached to the back of the hook 10, the point 13 is thrown outwardly and upwardly relative to the vertical plane A—A to engage it in the fish 18 as the bite is received. This helps to hook large fish that an ordinary hook would miss, preventing it from slipping harmlessly out of the fish's mouth.

The spring element 15 assists in the projection of the bob 13 upwardly and outwardly, since, as the line 12 is tensioned, the eyes 11 and 17 are drawn together, causing the bob 13 to rotate upwardly and outwardly about the eye 11 as a pivot. Due to the resilient nature of the spring element 15, when tension in the line 12 is released, the spring element 15 will return to its original position (Fig. 1) to again lower the bob 13 to the position of Fig. 1. Thus, in Fig. 3, the spring element is under tension and would normally tend to bias the bob downwardly and backwardly. However, the tension in the line is greater than the tension in the spring element maintaining the bob in the upwardly and outwardly projected position until tension is released in the line.

It will be noted that because of the particular shape of the hook 10 it takes on a larger shape when the bite is received, as will be noted by comparing Figs. 1 and 3. Thus, because the wire is flexible when a bite is received, the point is raised high so that the fish cannot escape.

While various changes may be made in the detail construction, it shall be understood that such changes shall be within the spirit and scope of the present invention as defined by the appended claim.

What I claim as new and desire to protect by Letters Patent of the United States is:

A fish hook comprising a curved length of metal formed at its lower end with a sharp point adapted to receive a bait thereon and to impale the mouth of a fish, an eye integrally formed at the upper end of said curved length of metal for connecting a fish line thereto, and a length of normally straight spring wire secured at its lower end to the back of said curved length of metal intermediate said eye and point, and an eye integrally formed at the upper end of said spring wire adapted to slidably receive the fishing line.

References Cited in the file of this patent

UNITED STATES PATENTS

| 699,397 | Lacey | May 6, 1902 |

FOREIGN PATENTS

| 18,397 | Great Britain | 1895 |
| 79,963 | Germany | 1895 |